US008140913B2

(12) United States Patent  
Onitsuka et al.

(10) Patent No.: US 8,140,913 B2
(45) Date of Patent: Mar. 20, 2012

(54) APPARATUS AND METHOD FOR MONITORING COMPUTER SYSTEM, TAKING DEPENDENCIES INTO CONSIDERATION

(75) Inventors: Yasuhiko Onitsuka, Yokohama (JP); Takaki Kuroda, Machida (JP)

(73) Assignee: Hitachi, Ltd., Tokyo (JP)

( * ) Notice: Subject to any disclaimer, the term of this patent is extended or adjusted under 35 U.S.C. 154(b) by 338 days.

(21) Appl. No.: 12/136,803

(22) Filed: Jun. 11, 2008

(65) Prior Publication Data

US 2009/0271667 A1 Oct. 29, 2009

(30) Foreign Application Priority Data

Apr. 23, 2008 (JP) ................... 2008-112103

(51) Int. Cl.
*G06F 11/00* (2006.01)
(52) U.S. Cl. ........................................ 714/47.1; 714/57
(58) Field of Classification Search ............... 714/47, 714/57, 47.1; 700/80
See application file for complete search history.

(56) References Cited

U.S. PATENT DOCUMENTS

| 5,293,323 | A | * | 3/1994 | Doskocil et al. | 702/185 |
| 5,581,242 | A | * | 12/1996 | Arita et al. | 340/691.6 |
| 7,043,661 | B2 | | 5/2006 | Valadarsky et al. | |
| 7,685,465 | B1 | * | 3/2010 | Shaw et al. | 714/15 |
| 2008/0208373 | A1 | * | 8/2008 | Thurau | 700/80 |
| 2009/0271667 | A1 | * | 10/2009 | Onitsuka et al. | 714/57 |
| 2010/0150170 | A1 | * | 6/2010 | Lee et al. | 370/466 |

FOREIGN PATENT DOCUMENTS

JP 2006-190138 7/2006

* cited by examiner

*Primary Examiner* — Philip Guyton
(74) *Attorney, Agent, or Firm* — Antonelli, Terry, Stout & Kraus, LLP.

(57) ABSTRACT

A system monitoring apparatus specifies an intentionally shutdown system component or monitoring target, and a different monitoring target that is dependent thereon (a dependent target), and does not display an alert even when an error state is detected for a monitoring target inside the intentionally shutdown system component or the intentionally shutdown monitoring target, and the dependent target of the system component or monitoring target.

18 Claims, 19 Drawing Sheets

FIG. 2

SYSTEM MONITORING CONSOLE

ALERT DISPLAY

MONITORING CONFIGURATION

SCHEDULED SHUTDOWN SCHEDULE

ALERT DISPLAY

| TYPE ▲ | DATE / TIME | SOURCE | DESCRIPTION | |
|---|---|---|---|---|
| ERROR | 01/01 01:01 | HOST1 / D DRIVE | FILE SYSTEM UNRECOGNIZABLE | (1) |
| ERROR | 01/01 01:01 | HOST2 / D DRIVE | FILE SYSTEM UNRECOGNIZABLE | (X) |
| ERROR | 01/01 01:01 | HOST3 / D DRIVE | FILE SYSTEM UNRECOGNIZABLE | (2) |
| ERROR | 01/01 01:01 | HOST4 / D DRIVE | FILE SYSTEM UNRECOGNIZABLE | (3) |
| ERROR | 01/01 01:01 | SW2 / PORT4 | LINK SHUT DOWN | (4) |
| ERROR | 01/01 01:01 | SW2 / PORT2 | LINK SHUT DOWN | (5) |
| ERROR | 01/01 01:01 | STORAGE1 / LU3 | INFORMATION UNACQUIRABLE | (6) |
| ERROR | 01/01 01:01 | STORAGE1 / LU2 | INFORMATION UNACQUIRABLE | |
| ERROR | 01/01 01:01 | STORAGE1 / LU1 | INFORMATION UNACQUIRABLE | |
| ERROR | 01/01 01:01 | STORAGE1 / PORT B | INFORMATION UNACQUIRABLE | |
| ERROR | 01/01 01:01 | STORAGE1 / PORT A | INFORMATION UNACQUIRABLE | |

FIG. 4

1031: SYSTEM CONFIGURATION TABLE

| # | SYSTEM COMPONENT |
|---|---|
| 1 | HOST1 |
| 2 | HOST2 |
| 3 | HOST3 |
| 4 | HOST4 |
| 5 | SW1 |
| 6 | SW2 |
| 7 | SW3 |
| 8 | STORAGE1 |
| 9 | STORAGE2 |

FIG. 5

| # | HOST NAME | DRIVE NAME | DISK INFORMATION | HBA USED | PORT NO. OF HBA USED | TARGET ID | LUN |
|---|---|---|---|---|---|---|---|
| 1 | HOST1 | C: | LOCAL DISK | – | – | – | – |
| 2 | HOST1 | D: | EXTERNAL DISK | HBA1 | 1 | 1 | LUN1 |
| 3 | HOST1 | E: | EXTERNAL DISK | HBA1 | 1 | 2 | LUN1 |
| 4 | HOST2 | C: | LOCAL DISK | – | – | – | – |
| 5 | HOST2 | D: | EXTERNAL DISK | HBA2 | 1 | 1 | LUN2 |
| ⋮ | ⋮ | ⋮ | ⋮ | ⋮ | ⋮ | ⋮ | ⋮ |

FIG. 6

| # | HBA NAME | PORT NO. | WWN | TARGET ID | WWN OF CONNECTION-DESTINATION STORAGE PORT |
|---|---|---|---|---|---|
| 1 | HBA1 | 1 | aa:aa:aa:aa:aa:aa:aa:a1 | 1 | xx:xx:xx:xx:xx:xx:xx:a1 |
| 2 | HBA1 | 1 | aa:aa:aa:aa:aa:aa:aa:a1 | 2 | yy:yy:yy:yy:yy:yy:yy:a1 |
| 3 | HBA1 | 2 | aa:aa:aa:aa:aa:aa:aa:a2 | – | – |
| 4 | HBA2 | 1 | bb:bb:bb:bb:bb:bb:bb:b1 | 1 | yy:yy:yy:yy:yy:yy:yy:a1 |
| ⋮ | ⋮ | ⋮ | ⋮ | ⋮ | ⋮ |

FIG. 7

| # | STORAGE DEVICE NAME | PORT WWN | LUN SECURITY INFORMATION | |
|---|---|---|---|---|
| | | | LUN | ACCESS-ALLOWED HOST NAME |
| 1 | STORAGE1 | xx:xx:xx:xx:xx:xx:xx:a1 | LU1 | HOST1 |
| 2 | | | LU3 | HOST3 |
| 3 | | xx:xx:xx:xx:xx:xx:xx:b1 | LU2 | HOST4 |
| 4 | STORAGE2 | yy:yy:yy:yy:yy:yy:yy:a1 | LU1 | HOST1 |
| 5 | | | LU2 | HOST2 |
| 6 | | | LU3 | HOST3 |
| 7 | | yy:yy:yy:yy:yy:yy:yy:b1 | – | – |
| ⋮ | ⋮ | ⋮ | ⋮ | ⋮ |

FIG. 8

| # | SWITCH NAME | WWN OF RESPECTIVE PORTS | WWN OF CONNECTION-DESTINATION PORT |
|---|---|---|---|
| 1 | FC-SW1 | ss:ss:ss:ss:ss:ss:ss:s1 | aa:aa:aa:aa:aa:aa:aa:a1 |
| 2 | | ss:ss:ss:ss:ss:ss:ss:s2 | bb:bb:bb:bb:bb:bb:bb:b1 |
| 3 | | ss:ss:ss:ss:ss:ss:ss:s3 | – |
| 4 | | ss:ss:ss:ss:ss:ss:ss:s4 | – |
| 5 | | ss:ss:ss:ss:ss:ss:ss:s5 | – |
| 6 | | ss:ss:ss:ss:ss:ss:ss:s6 | tt:tt:tt:tt:tt:tt:tt:t6 |
| 7 | FC-SW2 | tt:tt:tt:tt:tt:tt:tt:t1 | cc:cc:cc:cc:cc:cc:cc:c1 |
| 8 | | tt:tt:tt:tt:tt:tt:tt:t2 | uu:uu:uu:uu:uu:uu:uu:u1 |
| 9 | | tt:tt:tt:tt:tt:tt:tt:t3 | – |
| 10 | | tt:tt:tt:tt:tt:tt:tt:t4 | xx:xx:xx:xx:xx:xx:xx:a1 |
| 11 | | tt:tt:tt:tt:tt:tt:tt:t5 | yy:yy:yy:yy:yy:yy:yy:a1 |
| 12 | | tt:tt:tt:tt:tt:tt:tt:t6 | ss:ss:ss:ss:ss:ss:ss:s6 |
| ⋮ | | ⋮ | ⋮ |

FIG. 9

1032: DEPENDENCY TABLE

| SYSTEM COMPONENT | | DEPENDENT TARGET | | | | |
|---|---|---|---|---|---|---|
| HOST1 | SW1 / P1 | – | – | – | – | – |
| HOST2 | SW1 / P2 | – | – | – | – | – |
| HOST3 | SW2 / P1 | – | – | – | – | – |
| HOST4 | SW3 / P6 | – | – | – | – | – |
| SW1 | HOST1 / D DRIVE E DRIVE | HOST2 / D DRIVE | SW2 / P6 | – | – | – |
| SW2 | HOST1 / D DRIVE E DRIVE | HOST2 / D DRIVE | HOST3 / D DRIVE E DRIVE | SW1 / P6 | STORAGE1 / FC-PORT A | STORAGE2 / FC-PORT A |
| SW3 | HOST4 / D DRIVE | SW1 / P2 | STORAGE1 / FC-PORT B | – | – | – |
| STORAGE1 | HOST1 / D DRIVE | HOST3 / D DRIVE | HOST4 / D DRIVE | SW2 / P4 | SW3 / P1 | – |
| STORAGE2 | HOST1 / E DRIVE | HOST2 / E DRIVE | HOST3 / E DRIVE | SW2 / P5 | SW3 / P2 | – |

FIG. 10

1033: SCHEDULE TABLE

| COMPONENT | SHEDULED SHUTDOWN SCHEDULE |
|---|---|
| HOST1 | DAILY 03:00–05:00 |
| HOST2 | - |
| HOST3 | DAILY 05:00–06:00 |
| HOST4 | - |
| SW1 | - |
| SW2 | 9/1 12:00–17:00 |
| SW3 | - |
| STORAGE1 | 1$^{ST}$ OF EACH MONTH 1:00–03:00 |
| STORAGE2 | 15$^{TH}$ OF EACH MONTH 1:00–03:00 |

FIG. 11

1034: MONITORING STATUS TABLE

| MONITORING TARGET | MONITORING STATUS | END DETERMINATION COUNT VALUE |
|---|---|---|
| HOST1 / D DRIVE | MONITORING RESTRICTED | – |
| HOST1 / E DRIVE | NORMAL MONITORING | – |
| HOST2 / D DRIVE | NORMAL MONITORING | – |
| HOST3 / D DRIVE | MONITORING RESTRICTED | – |
| HOST3 / E DRIVE | NORMAL MONITORING | – |
| HOST4 / D DRIVE | MONITORING RESTRICTED | – |
| SW1 / P1 | NORMAL MONITORING | – |
| SW1 / P2 | NORMAL MONITORING | – |
| SW1 / P3 | NORMAL MONITORING | – |
| SW1 / P4 | NORMAL MONITORING | – |
| SW1 / P5 | NORMAL MONITORING | – |
| SW1 / P6 | NORMAL MONITORING | – |
| SW2 / P1 | NORMAL MONITORING | – |
| SW2 / P2 | NORMAL MONITORING | – |
| SW2 / P3 | NORMAL MONITORING | – |
| SW2 / P4 | MONITORING RESTRICTED | – |
| SW2 / P5 | NORMAL MONITORING | – |
| SW2 / P6 | NORMAL MONITORING | – |
| SW3 / P1 | NORMAL MONITORING | – |
| SW3 / P2 | MONITORING RESTRICTED | – |
| SW3 / P3 | NORMAL MONITORING | – |
| SW3 / P4 | NORMAL MONITORING | – |
| SW3 / P5 | NORMAL MONITORING | – |
| SW3 / P6 | NORMAL MONITORING | – |
| STORAGE1 / PORT A | MONITORING SUSPENDED | 2 |
| STORAGE1 / PORT B | MONITORING SUSPENDED | 2 |
| STORAGE1 / LU1 | MONITORING SUSPENDED | 2 |
| STORAGE1 / LU2 | MONITORING SUSPENDED | 2 |
| STORAGE1 / LU3 | MONITORING SUSPENDED | 2 |
| STORAGE2 / PORT A | NORMAL MONITORING | – |
| STORAGE2 / PORT B | NORMAL MONITORING | – |
| STORAGE2 / LU1 | NORMAL MONITORING | – |
| STORAGE2 / LU2 | NORMAL MONITORING | – |
| STORAGE2 / LU3 | NORMAL MONITORING | – |

FIG. 12

1034: MONITORING STATUS TABLE

| MONITORING TARGET | MONITORING STATUS | END DETERMINATION COUNT VALUE |
|---|---|---|
| HOST1 / D DRIVE | MONITORING RESTRICTED | – |
| HOST1 / E DRIVE | MONITORING RESTRICTED | – |
| HOST2 / D DRIVE | MONITORING RESTRICTED | – |
| HOST3 / D DRIVE | MONITORING RESTRICTED | – |
| HOST3 / E DRIVE | MONITORING RESTRICTED | – |
| HOST4 / D DRIVE | NORMAL MONITORING | – |
| SW1 / P1 | NORMAL MONITORING | – |
| SW1 / P2 | NORMAL MONITORING | – |
| SW1 / P3 | NORMAL MONITORING | – |
| SW1 / P4 | NORMAL MONITORING | – |
| SW1 / P5 | NORMAL MONITORING | – |
| SW1 / P6 | MONITORING RESTRICTED | – |
| SW2 / P1 | MONITORING SUSPENDED | 2 |
| SW2 / P2 | MONITORING SUSPENDED | 2 |
| SW2 / P3 | MONITORING SUSPENDED | 2 |
| SW2 / P4 | MONITORING SUSPENDED | 2 |
| SW2 / P5 | MONITORING SUSPENDED | 2 |
| SW2 / P6 | MONITORING SUSPENDED | 2 |
| SW3 / P1 | MONITORING RESTRICTED | – |
| SW3 / P2 | NORMAL MONITORING | – |
| SW3 / P3 | NORMAL MONITORING | – |
| SW3 / P4 | NORMAL MONITORING | – |
| SW3 / P5 | NORMAL MONITORING | – |
| SW3 / P6 | NORMAL MONITORING | – |
| STORAGE1 / PORT A | MONITORING RESTRICTED | – |
| STORAGE1 / PORT B | NORMAL MONITORING | – |
| STORAGE1 / LU1 | NORMAL MONITORING | – |
| STORAGE1 / LU2 | NORMAL MONITORING | – |
| STORAGE1 / LU3 | NORMAL MONITORING | – |
| STORAGE2 / PORT A | MONITORING RESTRICTED | – |
| STORAGE2 / PORT B | NORMAL MONITORING | – |
| STORAGE2 / LU1 | NORMAL MONITORING | – |
| STORAGE2 / LU2 | NORMAL MONITORING | – |
| STORAGE2 / LU3 | NORMAL MONITORING | – |

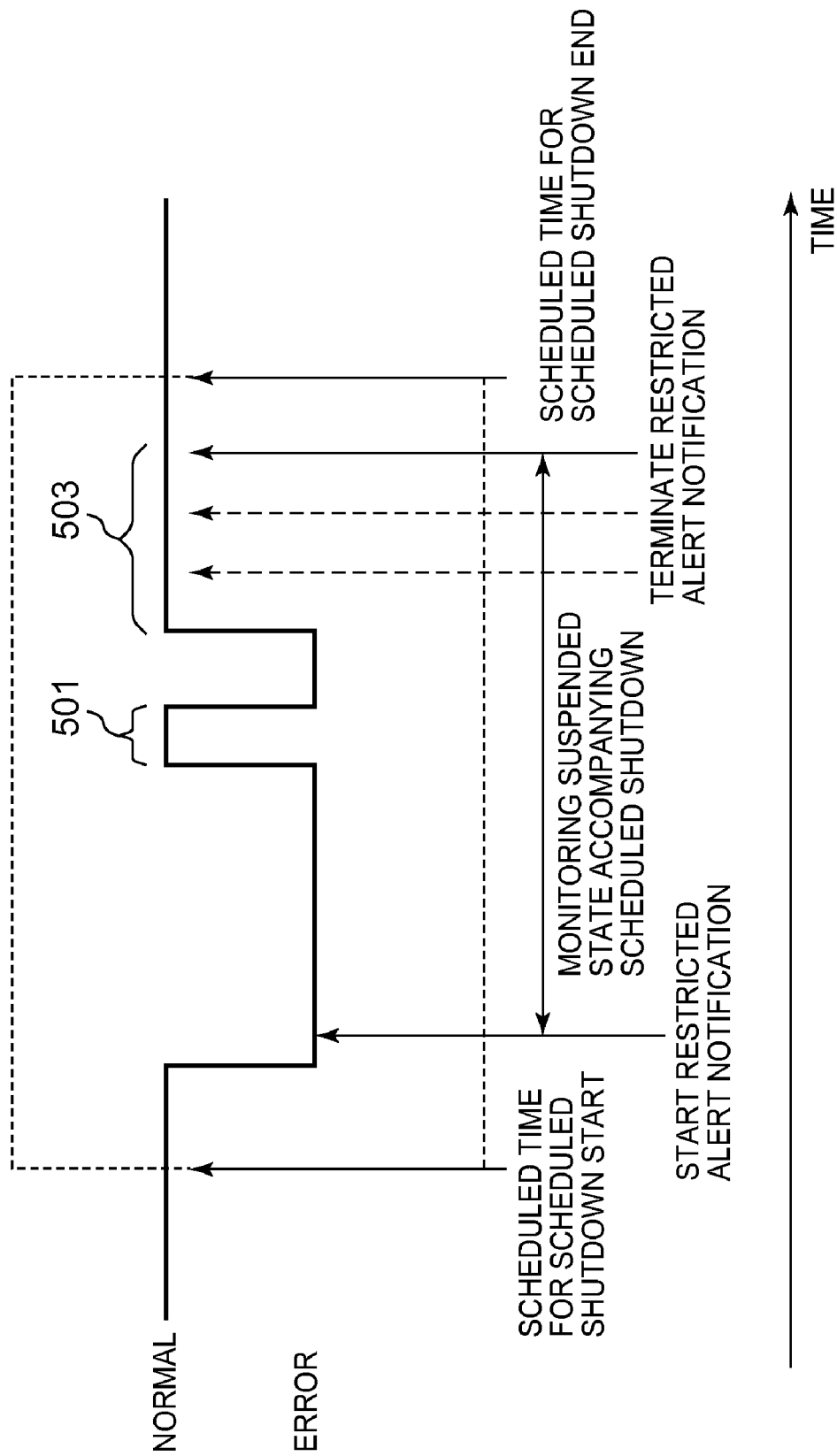

FIG. 20

| | SYSTEM MONITORING CONSOLE | | | | ~801 |
|---|---|---|---|---|---|
| ALERT DISPLAY | ALERT DISPLAY | | | | ~851 |
| | TYPE ▲ | DATE/TIME | SOURCE | DESCRIPTION | |
| MONITORING CONFIGURATION | ERROR | 01/01 01:01 | HOST2 D DRIVE | FILE SYSTEM UNRECOGNIZABLE | |
| SCHEDULED SHUTDOWN SCHEDULE | | | | | |

853 points to ALERT DISPLAY

FIG. 21

| | SYSTEM MONITORING CONSOLE | | | | ~801 |
|---|---|---|---|---|---|
| ALERT DISPLAY | ALERT DISPLAY | | | | ~851 |
| | TYPE ▲ | DATE/TIME | SOURCE | DESCRIPTION | |
| MONITORING CONFIGURATION | ERROR | 01/01 01:01 | HOST2 / D DRIVE | FILE SYSTEM UNRECOGNIZABLE | |
| SCHEDULED SHUTDOWN SCHEDULE | INFORMATION | 01/01 01:01 | HOST1 / D DRIVE | FILE SYSTEM UNRECOGNIZABLE | |
| | INFORMATION | 01/01 01:01 | HOST3 / D DRIVE | FILE SYSTEM UNRECOGNIZABLE | |
| | INFORMATION | 01/01 01:01 | HOST4 / D DRIVE | FILE SYSTEM UNRECOGNIZABLE | |
| | INFORMATION | 01/01 01:01 | SW2 / PORT4 | LINK SHUT DOWN | |
| | INFORMATION | 01/01 01:01 | SW3 / PORT2 | LINK SHUT DOWN | |
| | INFORMATION | 01/01 01:01 | STORAGE1 / LU3 | INFORMATION UNACQUIRABLE | |
| | INFORMATION | 01/01 01:01 | STORAGE1 / LU2 | INFORMATION UNACQUIRABLE | |
| | INFORMATION | 01/01 01:01 | STORAGE1 / LU1 | INFORMATION UNACQUIRABLE | |
| | INFORMATION | 01/01 01:01 | STORAGE1 / PORT B | INFORMATION UNACQUIRABLE | |
| | INFORMATION | 01/01 01:01 | STORAGE 1/ PORT A | INFORMATION UNACQUIRABLE | |

853 points to ALERT DISPLAY

FIG. 22

```
            SYSTEM MONITORING CONSOLE                801

MONITORING CONFIGURATION
ALERT DISPLAY
            IP ADDRESS RANGE FOR DEVICE
802         INFORMATION DETECTION                    803
   MONITORING
   CONFIGURATION    [xxx.xxx.x.x] – [xxx.xxx.x.x]

SCHEDULED        MONITORING INTERVAL
   SHUTDOWN             [ 15  ▼]
   SCHEDULE
                    END DETERMINATION
                    DEFINITION VALUE
                         [  3  ▼]

[CONFIGURE]
```

FIG. 23

| | SYSTEM MONITORING CONSOLE | | | 801 |
|---|---|---|---|---|
| | SCHEDULED SHUTDOWN SCHEDULE | | | 811 |
| ALERT DISPLAY | COMPONENT | SCHEDULED SHUTDOWN SCHEDULE | | |
| MONITORING CONFIGURATION | HOST1 | DAILY 03:00–05:00 | CHANGE | 600 |
| | HOST2 | – | CHANGE | |
| 812 SCHEDULED SHUTDOWN SCHEDULE | HOST3 | DAILY 05:00–06:00 | CHANGE | |
| | HOST4 | – | CHANGE | |
| | SW1 | – | CHANGE | |
| | SW2 | 9 / 1 12:00–17:00 | CHANGE | |
| | SW3 | – | CHANGE | |
| | STORAGE1 | 1ST OF EACH MONTH 1:00–03:00 | CHANGE | |
| | STORAGE2 | 15TH OF EACH MONTH 1:00–03:00 | CHANGE | |

FIG. 24

| SYSTEM MONITORING CONSOLE | 801 |

SCHEDULED SHUTDOWN SCHEDULE CHANGE — 813

ALERT DISPLAY

MONITORING CONFIGURATION

SCHEDULED SHUTDOWN SCHEDULE

HOST1 SCHEDULED SHUTDOWN SCHEDULE

◉ DAILY

○ WEEKLY   [MONTH ▼] DAY OF THE WEEK

○ MONTHLY  [01 ▼] DAY

○ DESIGNATED DATE  [2008 ▼] / [01 ▼] / [01 ▼]

START TIME
[03 ▼] : [00 ▼]

END TIME
[05 ▼] : [00 ▼]

[CONFIGURE]

APPARATUS AND METHOD FOR MONITORING COMPUTER SYSTEM, TAKING DEPENDENCIES INTO CONSIDERATION

CROSS-REFERENCE TO PRIOR APPLICATION

This application relates to and claims the benefit of priority from Japanese Patent Application number 2008-112103, filed on Apr. 23, 2008 the entire disclosure of which is incorporated herein by reference.

BACKGROUND

The present invention generally relates to the monitoring of a computer system.

For example, the computer system shown in FIG. 1 is known. As the component devices of this computer system (hereinafter, referred to as the "system components"), there are one or more hosts (Host1 through Host4), one or more storage devices (Storage1 through Storage2), and one or more FC-SW (FC-SW1 through FC-SW3). FC-SW is the abbreviation for Fibre Channel Switch, and at least one of the hosts, storage devices and other FC-SWs is connected to the FC-SW.

As the apparatus that monitors these system components, there is a system monitoring apparatus 50. The system monitoring apparatus 50, for example, monitors the respective system components by way of a LAN (Local Area Network).

According to the computer system of FIG. 1, for example, when Storage1 is systematically shut down, an error is detected for the following reasons for the following monitoring targets (1) through (6) inside the system components.

(1) D drive inside Host1: (Reason) This is because the D drive is the logical volume mapped to LU1 inside Storage1 that has been shut down. (Incidentally, "LU" is the abbreviation for Logical Unit, and as used here, an LU is a logical storage device created on the basis of an HDD or other such physical storage device.)

(2) D drive inside Host3: (Reason) This is because the D drive is the logical volume mapped to LU3 inside Storage1 that has been shut down.

(3) D drive inside Host4: (Reason) This is because the D drive is the logical volume mapped to LU2 inside Storage1 that has been shut down.

(4) Port4 (P4) of FC-SW2: (Reason) This is because Port4 is the port connected to FC-PortA of Storage1 that has been shut down.

(5) Port2 (P2) of FC-SW3: (Reason) This is because Port2 is the port connected to FC-PortB of Storage1 that has been shut down.

(6) All device elements inside Storage1 (FC-PortA, FC-PortB, LU1, LU2 and LU3): (Reason) This is because these device elements are the elements inside Storage1 that has been shut down.

Thus, the system monitoring apparatus 50, as shown in FIG. 2, issues error alerts for the above-mentioned monitoring targets (1) through (6) by way of a console screen (for example, a window portrayed on a display screen). The administrator or other such person will check the cause of the error for an error-alerted monitoring target and/or the system component having this monitoring target.

Furthermore, Japanese Patent Application Laid-open No. 2006-190138 discloses technology for notifying attribute information, such as scheduled shutdown or under repair. Thus, if the technology of Japanese Patent Application Laid-open No. 2006-190138 is applied to the monitoring technology explained by referring to FIGS. 1 and 2, the cause of an error that occurred in Storage1 can be expected to be displayed as scheduled shutdown.

As shown in FIGS. 1 and 2, when each of a plurality of system components has a dependence relationship with the other system components of this plurality of system components, if an error is detected for one monitoring target, a large number of errors will be detected for the computer system as a whole. According to Japanese Patent Application Laid-open No. 2006-190138, although the cause of the error can be displayed as scheduled shutdown for the systematically shut down Storage1, it is not clear what other monitoring targets are inside the other system components that have a dependence relationship with Storage1, nor what the causes of the errors detected for the other monitoring targets are.

Further, it should not be necessary to check the cause of an error that was detected due to a scheduled shutdown or other such intentional shutdown to begin with. This is because an intentional shutdown is a shutdown that is carried out for the purpose of maintenance or a reboot, and the cause of the detected error is self evident. For the same reason, it should also not be necessary to check the cause of an error, which occurred due to the intentional shutdown of a certain monitoring target, and which was detected for a different monitoring target that is dependent on this certain monitoring target.

However, as mentioned hereinabove, since it is not clear what other monitoring targets are dependent on the monitoring target that was intentionally shutdown, and the reason that an error was detected for the other monitoring target is unknown, when an error is detected for one or another monitoring target, the administrator or other such person is going to check the cause of the error even if this error is an error for which there is essentially no need to check for the cause. As a specific example, according to FIG. 2, in addition to the monitoring targets (1) through (6) for which errors have been detected due to an intentional shutdown, there is a monitoring target (X) for which an error was detected due to a reason other than the intentional shutdown. In this case, a great load is placed on the administrator in that it is not possible to select the error for which the cause needs to be checked and the error for which the cause does not need to be checked.

SUMMARY

Therefore, an object of the present invention is to exercise control in monitoring the computer system such that an error alert is not issued when the need to check the cause of the error is low.

Other objects of the present invention should become clear from the explanations given hereinbelow.

The system monitoring apparatus specifies an intentionally shutdown system component or monitoring target, and a different monitoring target that is dependent thereon (a dependent target), and does not execute an alert even when an error state is detected for the monitoring target inside the intentionally shutdown system component or the intentionally shutdown monitoring target, and the dependent target of the system component or monitoring target.

More specifically, the system monitoring apparatus comprises a storage module; a shutdown specification module; a dependence specification module; and a monitoring module. The storage module stores dependency information. Dependency information is information that denotes the relationship between a system component or a monitoring target inside this system component and a dependent target, which is dependent thereon, and which is a monitoring target inside another system component. The shutdown specification module specifies the intentionally shutdown system component from among the above-mentioned plurality of system components or the monitoring target. The dependency specification module specifies from the above-mentioned dependency information a dependent target that is dependent on the above-mentioned intentionally shutdown system component or monitoring target. The above-mentioned monitoring module monitors the status of the respective monitoring targets, and displays an error alert on a screen for a monitoring target for which an error state is detected, but does not display an alert for the monitoring target inside the above-mentioned specified system component or the above-mentioned specified monitoring target, and the above-mentioned specified dependent target even if an error state is detected.

An "intentional shutdown" is not limited to a scheduled shutdown, but rather can be a shutdown in accordance with an indication from the user (for example, an indication to shut off the power or to reboot). The computer system can be an open system or a mainframe system. The storage module is a storage resource such as a memory. At least one of the shutdown specification module, dependency specification module and monitoring module, for example, can be constructed from hardware, a computer program, or a combination of these (for example, one part can be realized by a computer program, and the remainder can be realized using hardware). The computer program is executed by being read into a prescribed processor. Further, a storage area that exists in a memory or other such hardware resource can be used as needed during information processing whereby the computer program is carried out by being read into the processor. Further, the computer program can be installed in a computer from a CD-ROM or other such recording medium, and can also be downloaded to the computer via a communications network. Further, a storage device can be physical or logical. A physical storage device, for example, can be a hard disk, magnetic disk, optical disk, magnetic tape or semiconductor memory. A logical storage device, for example, can be a logical volume. The shutdown specification module, dependency specification module and monitoring module, for example, can be realized by a system monitor 1014 described hereinbelow.

BRIEF DESCRIPTION OF THE DRAWINGS

FIG. 2 is a schematic diagram of an example of a task of the present invention;

FIG. 4 shows an example of a system configuration table;

FIG. 5 shows an example of a host information group;

FIG. 6 shows an example of an HBA information group;

FIG. 7 shows an example of a storage information group;

FIG. 8 shows an example of an FC-SW information group;

FIG. 9 shows an example of a dependency table;

FIG. 10 shows an example of a schedule table;

FIG. 11 shows an example of a monitoring status table;

FIG. 12 shows another example of a monitoring status table;

FIG. 13 is a simplified schematic diagram of the start determination and end determination of a scheduled shutdown;

FIG. 20 shows an example of the display when the monitoring status table is the table shown in FIG. 11, and an operating status "error" is detected for a monitoring target inside Storage1 and a dependent target of Storage1, and, in addition, an operating status "error" is detected for an additional monitoring target (Host2/D drive);

FIG. 21 shows another example of the display under the same circumstances as FIG. 20;

FIG. 22 shows a console screen in which a monitoring configuration sub-screen is displayed;

FIG. 23 shows a console screen in which a schedule sub-screen is displayed; and FIG. 24 shows a console screen in which a schedule change sub-screen is displayed.

DESCRIPTION OF THE PREFERRED EMBODIMENTS

A first embodiment of the present invention will be explained below by referring to the figures.

Figure 1:
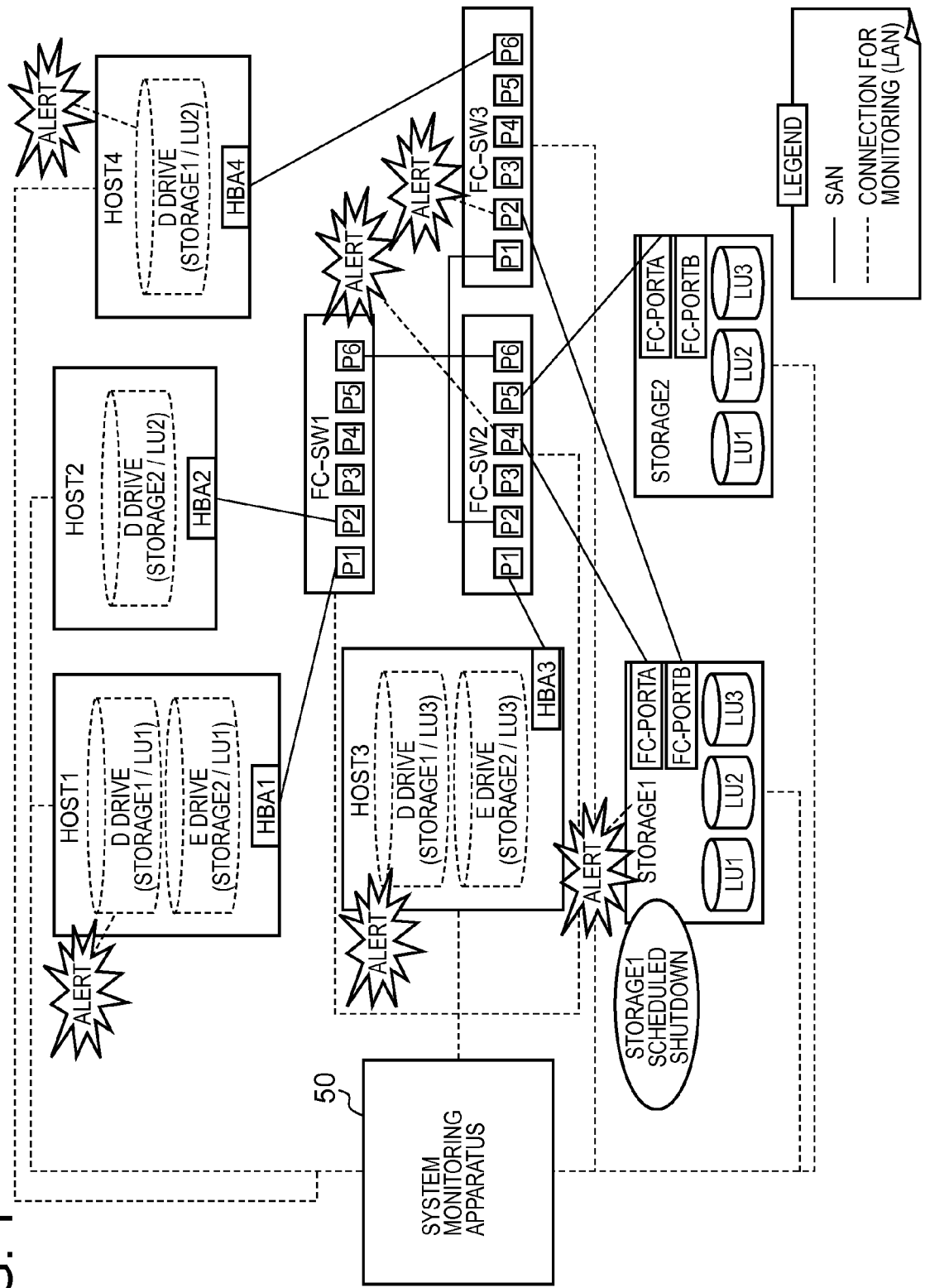
FIG. 1 shows an example of the configuration of a computer system.
Figure 3:
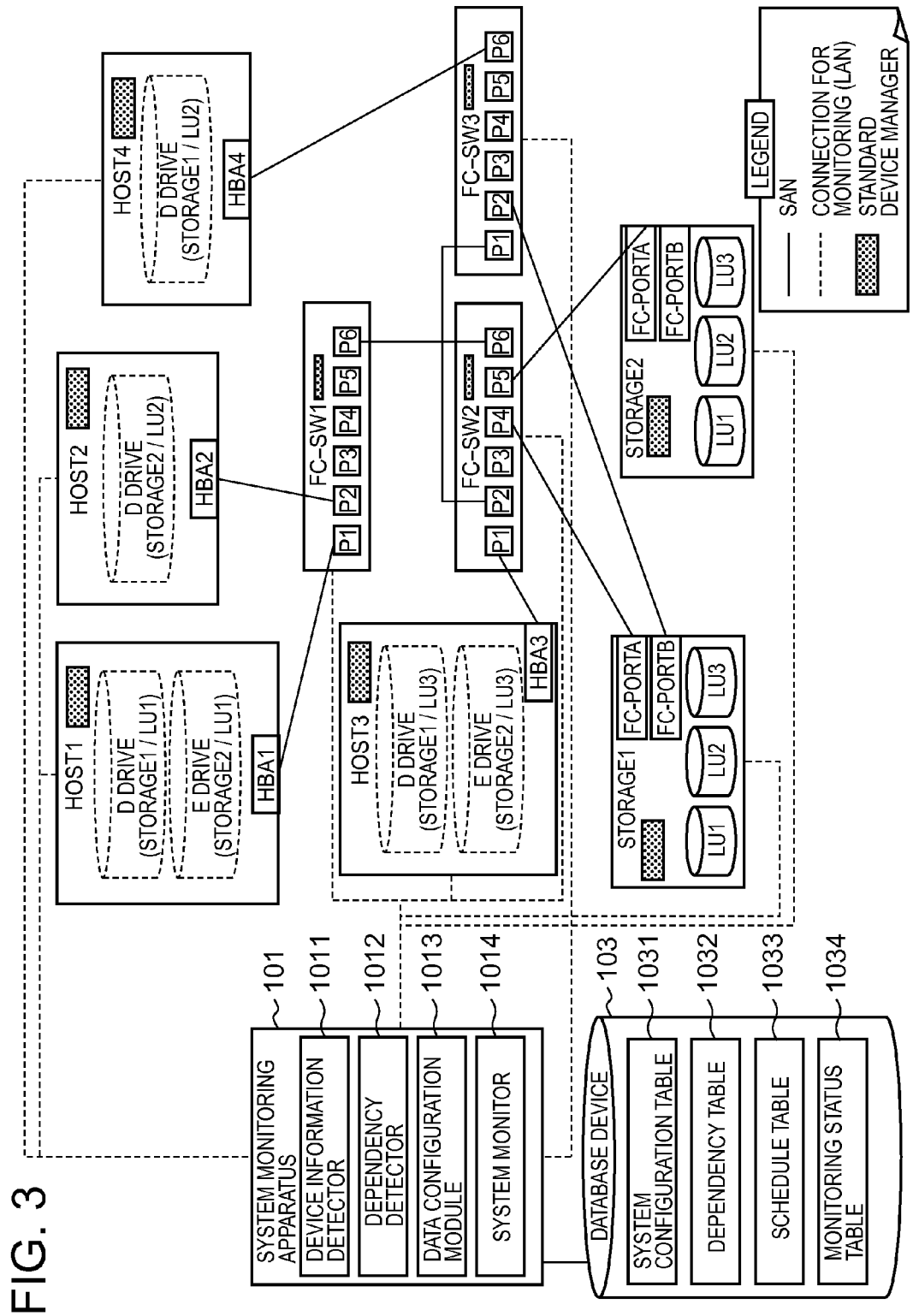
FIG. 3 shows a computer system related to a first embodiment of the present invention, and a system monitoring apparatus that monitors the respective system components of this computer system.

FIG. 3 shows a computer system related to the first embodiment of the present invention, and a system monitoring apparatus that monitors this computer system.

The system components of the computer system monitored by the system monitoring apparatus 101 include one or more hosts (Host1 through Host4), one or more storage devices (Storage1 through Storage 2) and one or more FC-SW (FC-SW1 through FC-SW3). At least one of a host, storage device and other FC-SW is connected to the FC-SW. The respective system components configure a SAN (Storage Area Network).

The storage device will be explained by using Storage1 as an example. Although not shown in the figure, Storage1 can be broadly divided into a controller and a storage module. The storage module, for example, is configured from one or more physical storage media (for example, a non-volatile storage medium such as a hard disk or flash memory). Logical units (LU1 through LU3) are created on the basis of this one or more physical storage media (for example, a non-volatile storage medium such as a hard disk or flash memory). The controller has a plurality of FC-Ports (FC-PortA, FC-PortB) connected to FC-SW, a memory, and a processor. The controller receives an I/O request from the host via FC-PortA or FC-PortB by way of the FC-SW, and in response to this I/O request, accesses the LU specified by this I/O request. The FC-Port is a communication port for delivering and receiving information or a command using the fibre channel protocol.

The host will be explained by using Host1 as an example. Host1 is a computer comprising a processor, a memory, and an HBA1 (HBA is the abbreviation for Host Bus Adapter). Although not shown in the figure, the computer program executed by the processor can include an application program, a volume management program and so forth. The volume management program, for example, manages a logical volume (for example, the D drive) that is mapped to the LU in Storage1 and/or Storage2. The application program specifies the logical volume and orders an I/O, whereby an I/O request, in which an LU mapped to the specified logical volume is specified as the I/O destination, is issued from the HBA1. The issued I/O request reaches Storage1 or Storage2 via the FC-SW.

The FC-SW will be explained by using FC-SW1 as an example. FC-SW1 has a plurality of communication ports (P1 through P6). A host, storage device or other FC-SW is connected to the respective communication ports. At least two of the host, storage device and other FC-SW are connected to FC-SW1.

Standard device managers are mounted in the above-described respective system components (host, storage device and FC-SW). The standard device manager is a device that acquires standard information (hereinafter, referred to as "component information") related to the system components comprising this manager, and, for example, is a WMI, SMI-S or SNMP server. The standard device manager, for example, sends component information to the system monitoring apparatus 101 via a LAN (Local Area Network). Incidentally, in this embodiment, the monitoring targets of the system monitoring apparatus 101 are the D drive and E drive of Host1, the D drive of Host2, the D drive and E drive of Host3, the D drive of Host4, P1 through P6 of FC-SW1, P1 through P6 of FC-SW2, P1 through P6 of FC-SW3, FC-PortA and FC-PortB of Storage1 and FC-PortA and FC-PortB of Storage2.

The system monitoring apparatus 101, for example, is a computer that comprises a processor (typically, a CPU), and a memory. The system monitoring apparatus 101 detects the operating status of the respective monitoring targets by regularly (or irregularly) querying the system component (more specifically, the standard device manager of the system component) about the operating status of the respective monitoring targets (that is, the system monitoring apparatus 101 detects the operating status of the respective monitoring targets via so-called polling). Consequently, if an error is detected for the monitoring target, the system monitoring apparatus 101 can know that an error has been detected for this monitoring target.

The system monitoring apparatus 101 comprises a device information detector 1011; a dependency detector 1012; a data configuration module 1013; and a system monitor 1014. The device information detector 1011, the dependency detector 1012, the data configuration module 1013, and the system monitor 1014 are functions that are realized by the processor executing a prescribed computer program read in from memory (and/or are realized by a hardware circuit). A database device (external storage device) 103, which is connected to the system monitoring apparatus 101, for example, stores a system configuration table 1031, which is a list of system components; a dependency table 1032 in which is recorded the dependency relationship between the respective system components and the monitoring targets; a schedule table 1033 in which is recorded the schedule related to the scheduled shutdowns of the respective system components; and a monitoring status table 1034 in which is recorded the monitoring statuses of the respective monitoring targets. The respective functions 1011 through 1014 of the system monitoring apparatus 101 and the respective tables 1031 through 1034 will be explained in detail hereinbelow.

<Device Information Detector 1011 and System Configuration Table 1031>

The device information detector 1011 detects a system component (host, storage device, FC-SW) that exists within a range of IP addresses specified by the administrator. Then, the device information detector 1011 acquires from the detected system component information representing this system component (the "system component name" here), and creates a system configuration table 1031 (refer to FIG. 4), which is a list of acquired system component names. The device information detector 1011, for example, can correspondently manage an IP address and a system component name on a one-to-one basis, and thereafter, can acquire information from a desired system component by using the IP address that has been made correspondent to the desired system component.

Furthermore, the range of IP addresses, for example, is received from the administrator by way of a monitoring configuration sub-screen 803 in a console screen 801 as shown in FIG. 22. The range of IP addresses inputted by the administrator via the monitoring configuration sub-screen 803 is configured in the memory inside the system monitoring apparatus 101. The console screen 801 is one type of GUI (Graphical User Interface) displayed by the system monitoring apparatus 101. The monitoring configuration sub-screen 803 is displayed in the console screen 801 in response to the monitoring configuration 802 being specified by a pointing device or the like. The monitoring configuration sub-screen 803 is the screen for receiving a monitoring-related configuration from the administrator. In addition to the range of IP addresses, a monitoring interval and end determination definition value can be inputted to the monitoring configuration sub-screen 803. The "monitoring interval" is a time interval for querying the same system component about the operating status of monitoring targets. For example, the system monitoring apparatus 101 inquires about the operating statuses of the D drive and the E drive in Host1 for each configured monitoring interval (for example, every 15 minutes). The "end determination definition value" is a threshold that is compared against an end determination count value to be explained hereinbelow for determining whether or not the scheduled shutdown has ended.

<Dependency Detector 1012 and Dependency Table 1032>

The dependency detector 1012 acquires information from the respective system components through the device information detector 1011, and creates or updates the dependency table 1032 based on the acquired information. This process, for example, is executed regularly, or at a timing created by the system configuration table or specified by the administrator.

Figure 16:
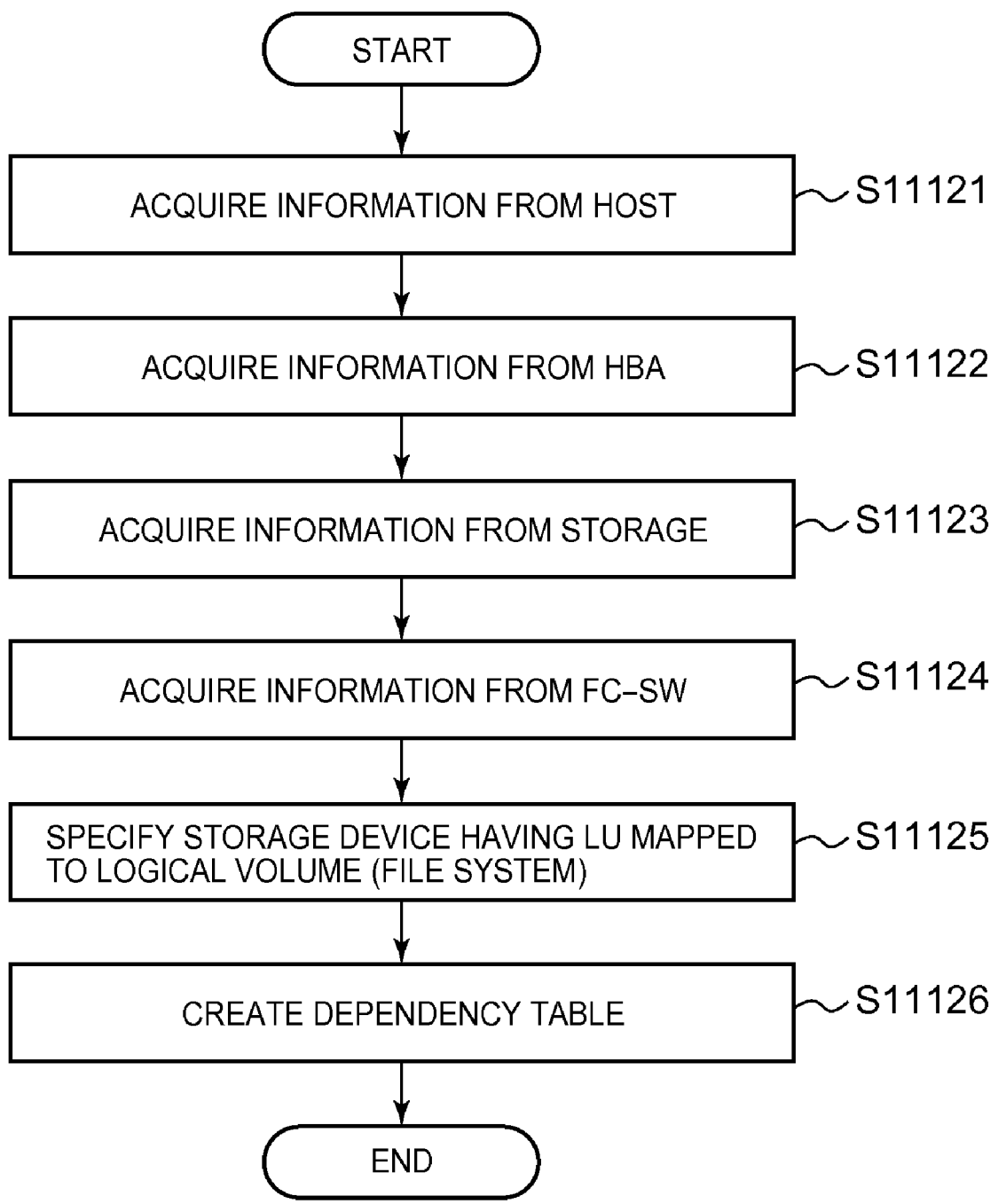
FIG. 16 shows the details of S1112 of FIG. 15.

The processing carried out by the dependency detector 1012 will be explained in detail hereinbelow by referring to FIG. 16.

S11121: Acquire Information from Host

The dependency detector 1012 acquires from the respective hosts information related to the logical volumes (file systems) managed by the hosts, and writes the acquired information to memory. The acquired information, for example, includes the host name, information related to the logical volume (file system) (drive name, disk information, LUN (Logical Unit Number)), name of the HBA to be used, the port number of the HBA to be used, and a target ID as shown in FIG. 5. In this embodiment, the monitoring target is the drive that has "external disk" as the disk information, in other words, the drive to which an LU inside an external storage device, such as Storage1 or Storage2, is mapped. Hereinafter, the information acquired from a single host (information configured from the host name, logical volume-related information, HBA name, HBA port number, and target ID) will be referred to as the "host information", and host information for a plurality of hosts will be referred to as a "host information group". Furthermore, the host information does not comprise information denoting to which storage device the LU corresponding to the LUN inside this host information belongs (for example, serial number of the storage device). Thus, at this Step S11121, it is not possible to determine the storage device to which this LUN belongs.

S11122: Acquire Information from HBA

The dependency detector 1012 acquires from the HBA of the respective hosts an HBA WWN (World Wide Name) that corresponds to the port number inside the host information, and the WWN of the connection-destination storage port of this HBA (the FC-Port of the storage device), and writes the acquired information to the memory. As a result of this, an information group like that shown in FIG. 6 is written to the memory. Hereinafter, the information acquired from a single HBA (information configured from the HBA name, port number, WWN, target ID, and connection-destination storage port WWN) will be referred to as the "HBA information", and the HBA information of a plurality of HBA will be referred to as an "HBA information group".

S11123: Acquire Information from Storage Device

The dependency detector 1012 acquires from the respective storage devices the FC-Port WWN, and the LUN security information of this FC-Port (for example, a list of the names of the hosts allowed to access each LU associated with this FC-Port), and writes the acquired information to the memory. As a result of this, an information group like that shown in FIG. 7 is written to the memory. Hereinafter, the information acquired from a single storage device (information configured from the storage device name, FC-Port WWN, and LUN security information) will be referred to as the "storage information", and the storage information of a plurality of storage devices will be referred to as a "storage information group".

S11124: Acquire Information from FC-SW

The dependency detector 1012 acquires from the respective FC-SW the WWN of each FC-SW port, and the WWN of the connection-destination port thereof (the HBA, and the storage port or port of another FC-SW), and writes the acquired information to the memory. As a result of this, an information group like that shown in FIG. 8 is written to the memory. Hereinafter, the information acquired from a single FC-SW (information configured from the switch name, WWN of the respective ports, and connection-destination port WWN) will be referred to as the "FC-SW information", and the FC-SW information of a plurality of FC-SW will be referred to as a "FC-SW information group". In the FC-SW information, #1 through #6 correspond to P1 through P6.

S11125: Specify Storage Device Having LU Mapped to Logical Volume (File System)

The dependency detector 1012 uses the host information group shown in FIG. 5, the HBA information group shown in FIG. 6, and the storage information group shown in FIG. 7 to specify the storage device having the LU that is mapped to the logical volume of the host (for example, the D drive). More specifically, for example, from FIG. 5 it is clear that LU1 corresponds to HBA1 and is mapped to the D drive inside Host1, from FIGS. 6 and 7 it is clear that the HBA1 port is connected to the FC-Port of Storage1, and from FIG. 7 it is clear that the Host1-accessible LU, which is associated with this FC-Port, is LU1. Therefore, in this S11125, LU1, which is mapped to the Host1 D drive, is specified as being the LU1 inside Storage1.

S11126: Create Dependency Table

The dependency detector 1012, based on the corresponding relationship specified in S11125 and on the FC-SW information group of FIG. 8, specifies a connection relationship showing which LU of which storage device is logically linked from which host (file system) HBA via which port of which FC-SW, and creates the dependency table 1032 shown in FIG. 9 on the bases of the specified connection relationship. More specifically, for example, since it is clear from FIGS. 6 and 8 that the WWN of the HBA1 port of Host1 is the WWN of the connection-destination port of P1 of FC-SW1, the monitoring target, which has a dependency relationship with the system component Host1 (hereinafter, will be referred to as the "dependent target") is P1 of FC-SW1 (SW1/P1). In other words, it is clear that the relationship is such that when Host1 transitions to a scheduled shutdown, an error is detected for SW1/P1. Further, for example, speaking in terms of the system component FC-SW1, from FIGS. 6 and 8 it is clear that HBA1 of Host1 is connected to P1, HBA2 of Host2 is connected to P2, and SW2/P6 is connected to P6. Therefore, the dependent targets of FC-SW1 are clearly the D drive and E drive inside Host1, the D dive inside Host2, and SW2/P6. The thus specified dependencies are written to the dependency table 1032. Information denoting a dependent target is written in the dependency table 1032 for each system component.

<Data Configuration Module 1013 and Schedule Table 1033>

The data configuration module 1013 creates or updates the schedule table 1033 in accordance with information defined by the administrator. An example of the schedule table 1033 is shown in FIG. 10. According to FIG. 10, information denoting the scheduled shutdown schedule for each system component is entered into the schedule table 1033. This information can be inputted to the above-mentioned console screen 801. For example, as shown in FIG. 23, when a pointing device or the like is used to specify configuration setting 812 in the console screen 801, the data configuration module 1013 displays a schedule sub-screen 811 in the console screen 801. The schedule sub-screen 811 is treated as the current schedule table 1033. When a change 600, for example, is specified in the sub-screen 811 for Host1, as shown in FIG. 24, a schedule change sub-screen 813 for changing the scheduled shutdown schedule for Host1 is displayed. The data configuration module 1013 receives from the administrator via this sub-screen 813 post-change scheduled shutdown schedule for Host1. When the scheduled shutdown schedule has been inputted, the data configuration module 1013 writes the inputted scheduled shutdown schedule to the column corresponding to Host1 in the schedule table 1033.

<System Monitor 1014 and Monitoring Status Table 1034>

The system monitor 1014 regularly (at the monitoring interval explained by referring to FIG. 22) acquires from the standard device managers of the respective system monitoring apparatuses the operating statuses of the respective monitoring targets, and if an acquired status is an error, alerts the administrator as needed of this error based on the monitoring status table 1034.

A monitoring status table 1034 for when Storage1 is undergoing a scheduled shutdown is shown in FIG. 11, and a monitoring status table 1034 for when SW2 is undergoing a scheduled shutdown is shown in FIG. 12.

A monitoring status and end determination count value are recorded in the monitoring status table 1034 for each monitoring target. The "monitoring status" is the state related to the monitoring of a monitoring target, and differs from the operating status (for example, normal or error) detected for the respective monitoring targets. The values denoting the monitoring status, for example, include "normal monitoring", "monitoring suspended" and "monitoring restricted". "Normal monitoring" signifies that monitoring is being carried out normally in that the operating status of the monitoring target is being queried at the monitoring interval. "Monitoring suspended" signifies that the monitoring target is inside a system component that is undergoing a scheduled shutdown. "Monitoring restricted" signifies that the monitoring target is dependent on the system component undergoing a scheduled shutdown (that is, the monitoring target is a dependent target). The "end determination count value" is the count value by which operating status "normal" is detected during a period specified from the scheduled shutdown schedule. The end determination count value is used in a determination as to whether or not a scheduled shutdown has ended. Thus, the end determination count value is updated for a monitoring target having a monitoring status of "monitoring suspended".

In this embodiment, the monitoring status of a monitoring target inside a system component undergoing a scheduled shutdown is automatically updated to "monitoring suspended", and the monitoring status of a dependent target for this system component is automatically updated to "monitoring restricted". When the system monitor 1014 detects the operating status "error" for a certain monitoring target, if the monitoring status of this monitoring target is "normal monitoring", an error alert is issued for this operating status, but if the monitoring status of this monitoring target is "monitoring suspended" or "monitoring restricted", the error is not alerted, or the error is displayed as information. More specifically, for example, according to FIG. 11, when Storage1 is subjected to a scheduled shutdown, Storage1/PortA, Storage1/PortB, Storage1/LU1, Storage1/LU2 and Storage1/LU3, which are the monitoring targets inside Storage1, are updated to the monitoring status "monitoring suspended", and Host1/D drive, Host3/D drive, Host4/D drive, SW2/P4 and SW3/P2, which are the dependent targets for Storage1, are updated to the monitoring status "monitoring restricted". In this case, when the operating status "error" is detected for the monitoring targets inside Storage1 and the Storage1 dependent targets, and, in addition, the operating status "error" is detected for a monitoring target besides these (that is, a monitoring target with a monitoring status "normal monitoring", for example, the Host2/D drive), as shown in FIG. 20, the system monitor 1014 will issue an error alert only for the Host2/D drive, and will not issue an error alert for the monitoring targets inside Storage1 and the Storage1 dependent targets. Or, as shown in FIG. 21, an error information display can be carried out instead of an alert for the monitoring targets inside Storage1 and the Storage1 dependent targets. That is, according to this embodiment, an alert is not issued for an error for which the cause does not need to be checked; an alert is only issued for an error for which the cause does need to be checked (that is, for an important error) Consequently, the administrator knows immediately which monitoring target needs to be checked as to the cause of an error. Furthermore, according to FIGS. 20 and 21, an error alert is carried out via the alert sub-screen 851 of the console screen 801. The alert sub-screen 851 is displayed when an alert display 853 has been specified in the console screen 801.

Overviews of the start determination and end determination of a scheduled shutdown are shown in FIG. 13. The box formed by the dotted line in FIG. 13 represents a time period (hereinafter, the scheduled shutdown definition period) specified from the scheduled shutdown schedule (refer to FIG. 10) for this monitoring target.

The scheduled shutdown start is the point in time subsequent to the start time of the scheduled shutdown definition period (subsequent to the time at which the scheduled shutdown is scheduled to start) for this monitoring target at which the operating status "error" is acquired for this monitoring target. That is, according to FIG. 13, after the operating status of the monitoring target inside the system component undergoing a scheduled shutdown has transitioned to "error", the point in time at which the operating status "error" has been acquired for this monitoring target in accordance with an inquiry from the system monitor 1014 constitutes the start of restricted alert notification (that is, the monitoring status of this monitoring target is updated to "monitoring suspended", and, in addition, the monitoring status of the dependent target of the system component undergoing the scheduled shutdown is updated to "monitoring restricted").

After the start of restricted alert notification, the operating status "normal" may be acquired for the monitoring target having the monitoring status "monitoring suspended" as depicted by reference numeral 501 (in this case, the end determination count value (refer to FIGS. 11 and 12) for this monitoring target is incremented by 1). However, since this operating status is temporary, the operating status "error" is acquired once again without this operating status being consecutively acquired for a prescribed number of times (or a fixed time) (in this case, the end determination count value for this monitoring target is reset to 0). Thus, "monitoring suspended" continues to be the monitoring status for this monitoring target.

The scheduled shutdown end is not the end of the scheduled shutdown definition period, but rather the point in time at which the operating status "normal" has been consecutively acquired for a prescribed number of times (or a fixed time) during the scheduled shutdown definition period. For example, as depicted by reference numeral 503, when the operation status "normal" has been acquired three times in succession, the restricted alert notification is terminated (end of scheduled shutdown). Furthermore, this "three times" (that is, the above-mentioned prescribed number of times) is the end determination definition value explained using FIG. 22.

As described hereinabove, the scheduled shutdown definition period and the actual scheduled shutdown period to not necessarily match. If work (for example, maintenance work) actually ends within the scheduled shutdown definition period and it is determined that the scheduled shutdown has ended, the monitoring status is updated to "normal monitoring" from "monitoring suspended" or "monitoring restricted". Furthermore, in this embodiment, when there is no determination that the scheduled shutdown has ended (that is, when the operating status "normal" has not been consecutively acquired the prescribed number of times) by the time the scheduled shutdown definition period ends (the time at which the scheduled shutdown is scheduled to end), a determination is made that the scheduled shutdown has ended at the end time of the scheduled shutdown definition period. Further, a point in time stipulated by the administrator can be the scheduled shutdown end time instead of the point in time at which the operating status "normal" is consecutively acquired the prescribed number of times.

The processing carried out by this embodiment will be explained in detail hereinbelow by referring to the flowcharts of FIGS. 14 through 19.

Figure 14:
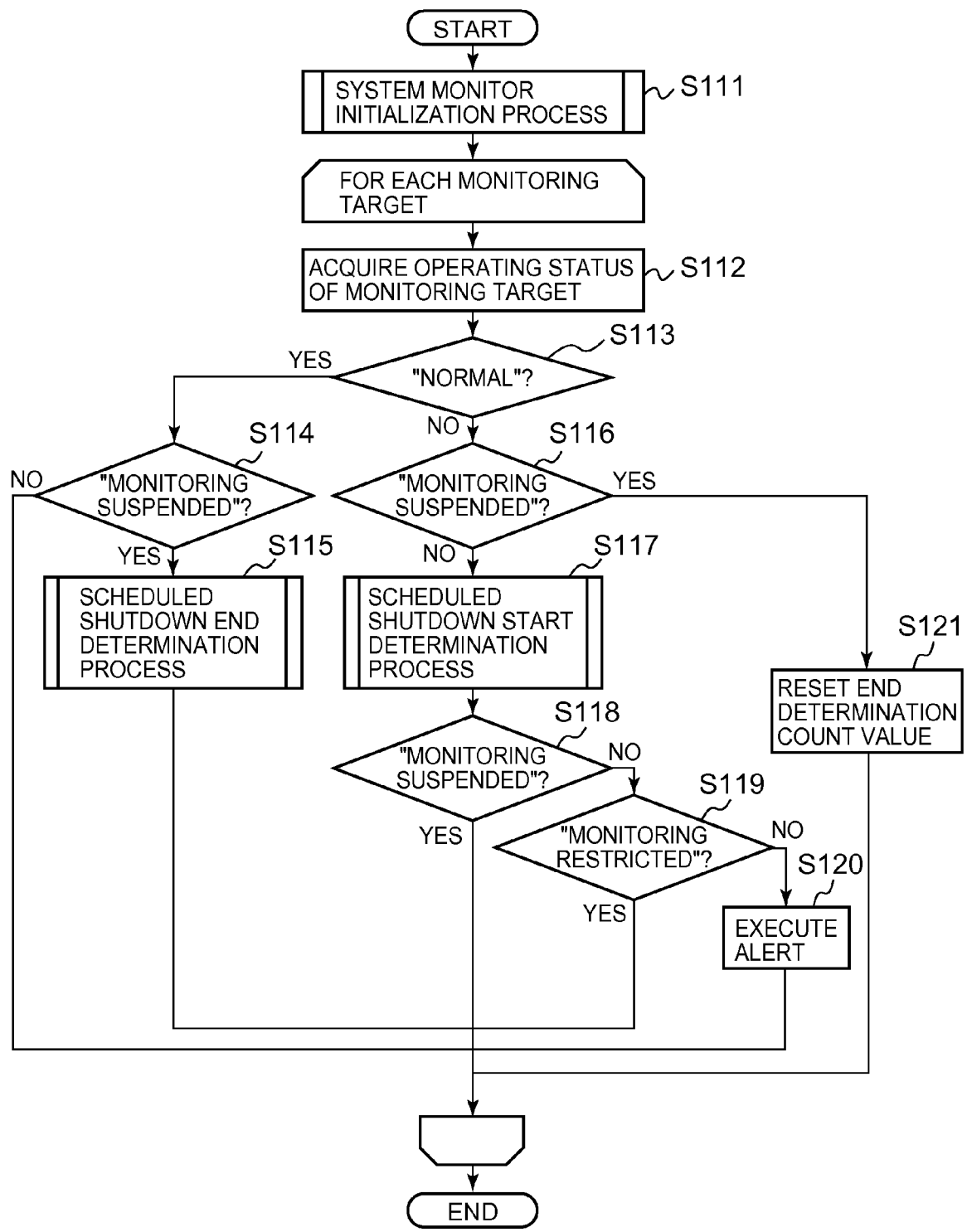
FIG. 14 shows the overall flow of processing by which the first embodiment of the present invention is carried out.

FIG. 14 shows the overall flow of processing carried out by this embodiment.

The system monitor 1014 executes an initialization process (S111). The details of S111 will be explained further below by referring to FIG. 15.

Subsequent to the end of the initialization process, the system monitor 1014 regularly executes S112 through S121 for the respective monitoring targets. S112 through S121 will be explained using Storage1/LU1 as an example of the monitoring target.

The system monitor 1014 acquires the operating statuses of the respective monitoring targets inside Storage1 from the standard device manager of FC-SW2 (S112).

The system monitor 1014 ends the current processing for the Storage1/LU1 when the operating status of Storage1/LU1 is "normal" and the monitoring status is not "monitoring suspended" (S113: Yes and S114: No).

The system monitor 1014 executes end determination processing for the scheduled shutdown when the operating status of Storage1/LU1 is "normal" and the monitoring status is "monitoring suspended" (S113: Yes and S114: Yes) (S115). The details of S115 will be explained further below by referring to FIG. 18.

The system monitor 1014 executes the start determination process for the scheduled shutdown when the operating status of Storage1/LU1 is "error" and the monitoring status is not "monitoring suspended" (S113: Yes and S116: No) (S117). The details of S117 will be explained in detail further below by referring to FIG. 17. When the monitoring status of the Storage1/LU1 is "monitoring suspended" or "monitoring restricted" subsequent to S117 (S118: Yes, or S118: No and S119: Yes), the system monitor 1014 ends the current processing for the Storage1/LU1. Conversely, when the monitoring status of the Storage1/LU1 is "normal monitoring" subsequent to S117 (S118: No and S119: No), the system monitor 1014 issues an alert regarding the operating status "error" of Storage1/LU1 via the console screen 801 (S120). An error alert is displayed for Storage1/LU1.

The system monitor 1014 resets the end determination count value for Storage1/LU1 to 0 when the operating status of Storage1/LU1 is "error" and the monitoring status is "monitoring suspended" (S113: No and S116: Yes) (S121).

Figure 15:
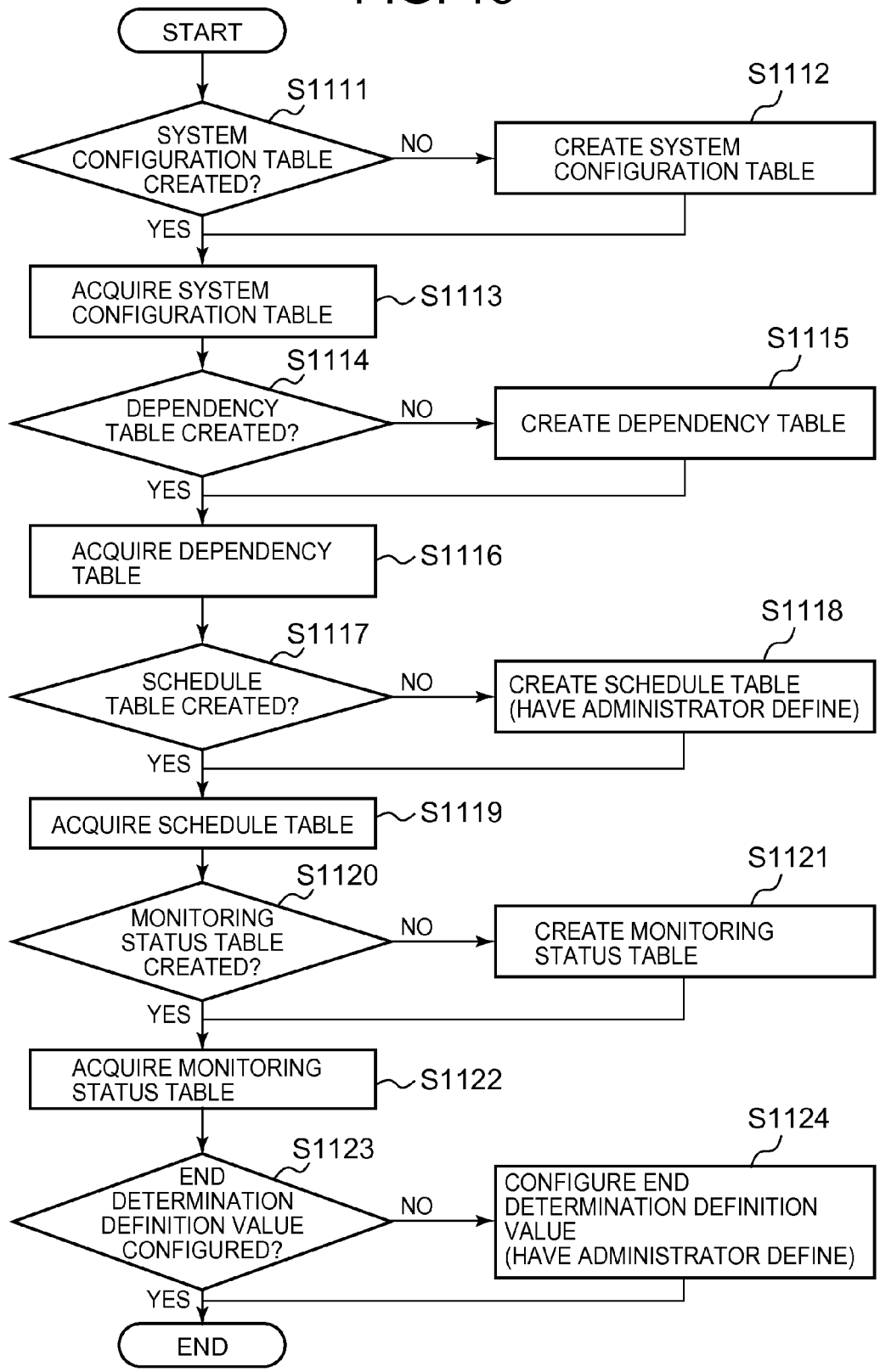
FIG. 15 shows the details of S111 of FIG. 14.

FIG. 15 shows the flow of processing for S111 of FIG. 14.

When a system configuration table has not been created (S1111: No), the system monitor 1014 causes the device information detector 1011 to execute the creation of a system configuration table (S1112). More specifically, for example, the device information detector 1011 receives from the administrator the specification for the range of IP addresses by way of the console screen 801. Thereafter, the device information detector 1011 acquires information from the system components in the specified IP address range, and creates a system configuration table 1031 (refer to FIG. 4). The system monitor 1014, for example, acquires the created system configuration table 1031 to the memory (S1113).

Next, when a dependency table 1032 has not been created (S1114: No), the system monitor 1014 causes the dependency detector 1012 to execute the creation of a dependency table 1032 (S1115). More specifically, for example, the dependency detector 1012 creates a dependency table 1032 (refer to FIG. 9) by executing the process already explained by referring to FIG. 16. The system monitor 1014, for example, acquires the created dependency table 1032 to the memory (S1116).

Next, when a schedule table 1033 has not been created (S1117: No), the system monitor 1014 causes the data configuration module 1013 to execute the creation of a schedule table 1033 (S1118). More specifically, for example, the data configuration module 1013 receives information related to the scheduled shutdown schedules for the respective monitoring targets via the console screen 801 (refer to FIGS. 23 and 24), and writes the inputted information to the schedule table 1033. The system monitor 1014, for example, acquires the created schedule table 1033 to the memory (S1119).

Next, when the monitoring status table 1034 has not been created (S1120: No), the system monitor 1014 causes the data configuration module 1013 to execute the creation of a monitoring status table 1034 (S1121). More specifically, for example, the data configuration module 1013 creates the monitoring status table 1034 on the bases of the host information group (FIG. 5), the HBA information group (FIG. 6), the storage information group (FIG. 7) and the FC-SW information group (FIG. 9) (at this point in time, for example, the monitoring statuses of all the monitoring targets are "normal monitoring"). The system monitor 1014, for example, acquires the created monitoring status table 1034 to the memory (S1122).

Finally, the system monitor 1014 determines whether or not the end determination definition value has been configured (S1123). If this value has not been configured (S1123: Yes), the data configuration module 1013 receives the end determination definition value via the console screen 801 (refer to FIG. 22), and, for example, writes the inputted end determination definition value to the memory (S1124).

S111 of FIG. 14 (initialization process) ends in accordance with a Yes in S1123 or the end of S1124.

Figure 17:
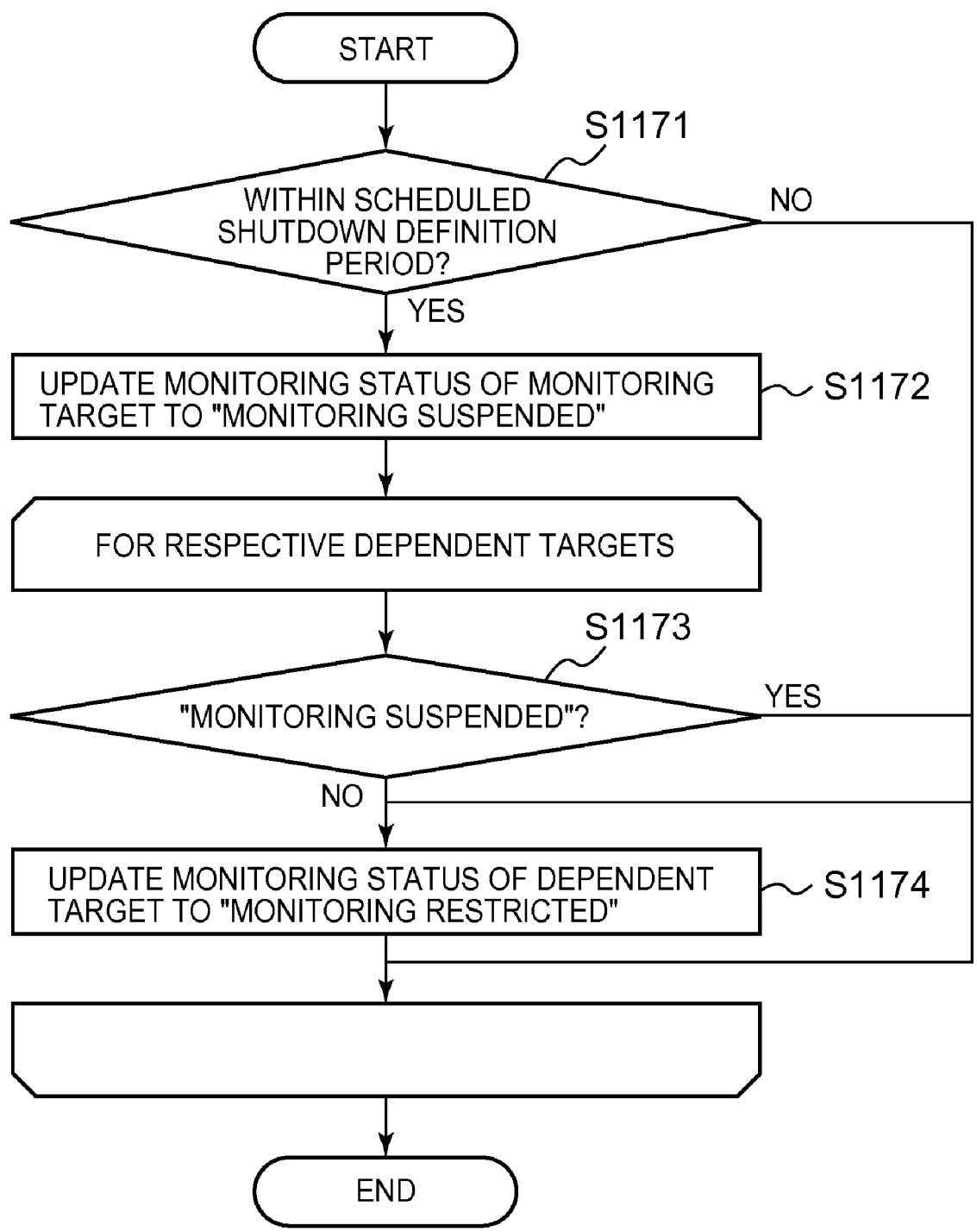
FIG. 17 shows the details of S117 of FIG. 14.

FIG. 17 shows the flow of processing for S117 of FIG. 14.

The system monitor 1014 specifies the scheduled shutdown definition period for Storage1, which has Storage1/LU1, from the scheduled shutdown schedule corresponding to Storage1 (the schedule recorded in the schedule table 1033), and determines whether or not the current time falls within this specified scheduled shutdown definition period (S1171).

When it is determined that the current time is within the scheduled shutdown definition period (S1171: Yes), the system monitor 1014 updates the monitoring statuses (monitoring statuses recorded in the monitor status table 1034) of all the monitoring targets inside Storage1 (to include Storage1/LU1) to "monitoring suspended" (S1172).

Next, the system monitor 1014 executes S1173 and S1174 for the respective dependent targets of Storage1, which are specified from the dependency table 1032. For example, if the monitoring status of Host1/D drive, which is one dependent target, is not "monitoring restricted" (S1173: No), the system monitor 1014 updates this monitoring status to "monitoring restricted" (S1174).

In this way, the monitoring statuses of all the monitoring targets inside the system component (Storage1) for which the operating status "error" has been acquired during the scheduled shutdown definition period are updated to "monitoring suspended" and the monitoring statuses of all the dependent targets of this system component (Storage1) are updated to "monitoring restricted" by a scheduled shutdown start determination process (S117 of FIG. 14) being carried out. In other words, the monitoring targets inside the system component undergoing the scheduled shutdown, and the dependent targets of this system component are automatically treated as targets that are not displayed as alerts.

Figure 18:
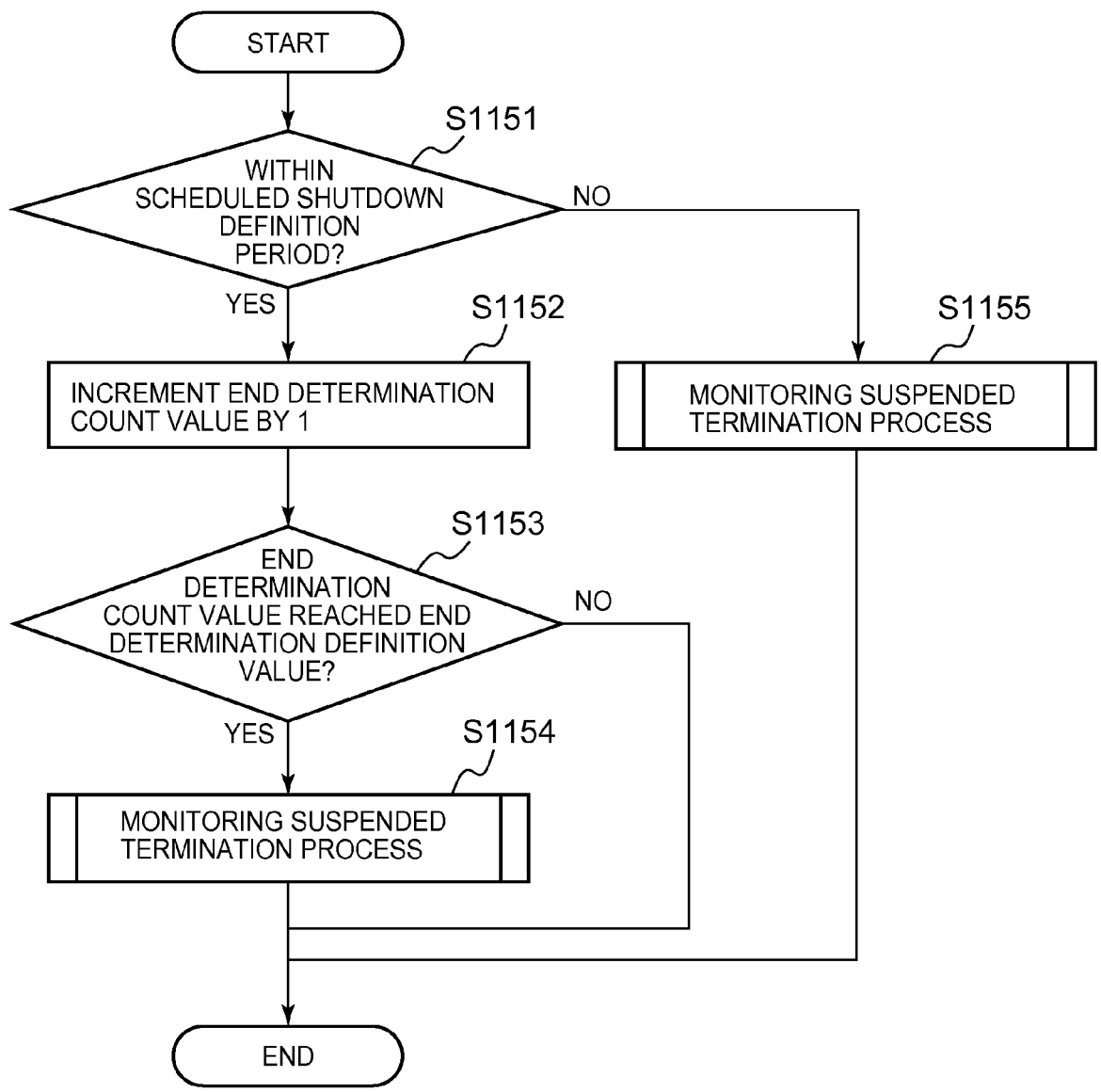
FIG. 18 shows the details of S115 of FIG. 14.

FIG. 18 shows the flow of processing for S115 of FIG. 14.

The system monitor 1014 specifies the scheduled shutdown definition period for Storage1, which has the Storage1/LU1, from the scheduled shutdown schedule corresponding to Storage1, and determines whether or not the current time is within this specified scheduled shutdown definition period (S1151).

When it is determined that the current time is within the scheduled shutdown definition period (S1151: Yes), the system monitor 1014 increments by 1 the end determination count values of all the monitoring targets (including Storage1/LU1) inside Storage1 (S1152). Then, if the post-update end determination count values of all these monitoring targets have reached the end determination definition value (S1153: Yes), the system monitor 1014 executes a monitoring suspended termination process for all these monitoring targets (S1154). Even when S1151 is No (that is, when it has been determined that the current time does not fall within the scheduled shutdown definition period), monitoring suspended termination processing is executed for all of the monitoring targets inside Storage1 (including Storage1/LU1) (S1155).

Figure 19:
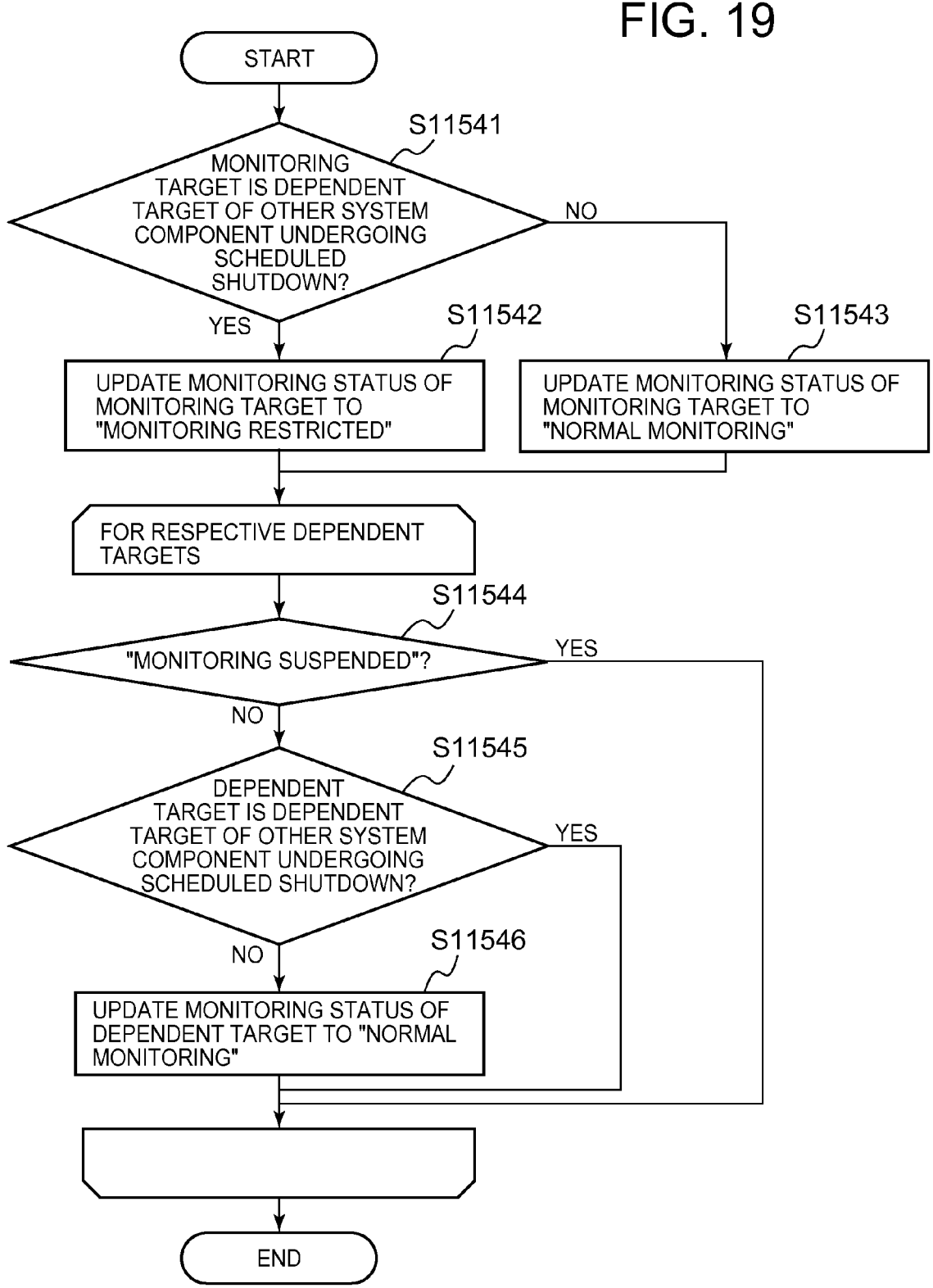
FIG. 19 shows the details of S1154 (and S1155) of FIG. 18.

FIG. 19 shows the flow of processing for S1154 (and S1155) of FIG. 18.

The system monitor 1014 references the dependency table 1032, and determines whether or not the respective monitoring targets inside Storage1 are dependent targets of another system component that is undergoing scheduled shutdown (S11541). The system monitor 1014 updates the monitoring status from "monitoring suspended" to "monitoring restricted" for a monitoring target for which the determination result in S11541 is affirmative (S11541: Yes) (S11542). Conversely, the system monitor 1014 updates the monitoring status from "monitoring suspended" to "normal monitoring" for a monitoring target for which the determination result in S11541 is negative (S11541: No) (S11543).

Further, the system monitor 1014 carries out S11544 through S11546 for all dependent targets of Storage1. For example, a determination is made as to whether or not the monitoring status of the Host1/D drive, which is a dependent target of Storage1, is "monitoring suspended" (S11544). When the result of this determination is negative (S11544: No), a determination is made based on the dependency table 1032 as to whether or not the Host1/D drive is a dependent target of another system component undergoing a scheduled shutdown (S11545). If the result of this determination is negative (S11545: No), the monitoring status of the Host1/D drive is updated to "normal monitoring" (S11546).

That is, according to FIGS. 18 and 19, a determination is automatically made as to whether or not the scheduled shutdown of the system component undergoing the scheduled shutdown has ended, and when the determination is that this shutdown has ended, if the monitoring targets inside this system component and the dependent targets of this system component are not the dependent targets of another system component that is undergoing a scheduled shutdown, these targets are automatically treated as the targets of an alert display.

The preferred embodiment of the present invention has been explained hereinabove, but this is an example for explaining the present invention, and does not purport to restrict the scope of the present invention to this embodiment alone. The present invention can be implemented in a variety of other forms.

For example, the system components of the computer system are not limited to a host, FC-SW and storage device, and other types of devices can also be employed. As for the monitoring targets as well, other targets that are not limited to the examples given hereinabove can be used.

Further, for example, instead of the system monitoring apparatus 101 polling a system component for the operating status, the system component can detect an error for a monitoring target inside the relevant system component, and can report this error to the system monitoring apparatus 101 without receiving a query from the system monitoring apparatus 101.

Further, for example, a dependent target can be recorded in the dependency table of FIG. 9 for each monitoring target instead of each system component. In this case, for example, when only Storage1/PortA is undergoing a scheduled shutdown (for example, when the interface device having FC-PortA of Storage1 is replaced), the monitoring status of Storage1/PortA is treated as "monitoring suspended", and the monitoring status of the dependent target of Storage1/PortA is treated as "monitoring restricted".

What is claimed is:

1. A system monitoring apparatus for monitoring a plurality of monitoring targets in a plurality of system components, which configure a computer system, the system monitoring apparatus comprising:
    a storage resource that stores dependency information denoting a relationship between (1) a system component or a monitoring target inside the system component, and (2) a dependent target, which is a monitoring target inside another system component;
    and a processor configured to:
    (A) specify an intentionally shutdown system component or monitoring target as a specified system component or a specified monitoring target, respectively, based on a preconfigured shutdown schedule period;
    (B) specify from the dependency information, a dependent target which is dependent on the intentionally shutdown system component or monitoring target, as a specified dependent target;
    (C) monitor statuses of the respective monitoring targets;
    (D) in case an error state of a given monitoring target is detected, display an error alert on a screen for the given monitoring target for which the error state is detected, while not displaying an error alert if the given monitoring target is the specified monitoring target, the specified dependent target or the monitoring target inside the specified system component;
    (E) detect a normal state lasting for a predetermined period, of one or more of the intentionally shutdown system component or monitoring target within the preconfigured shutdown schedule period, as an indicator of an early end to the preconfigured shutdown schedule period.

2. The system monitoring apparatus according to claim 1, wherein the plurality of system components are a host device, a Host Bus Adapter (HBA), a switching device and a storage device,
    the system monitoring apparatus further comprises:
    an information acquisition module that acquires host information related to the host device, Host Bus Adapter (HBA) information related to the HBA of the host device, switching information related to the switching device, and storage information related to the storage device; and
    a dependency detector that creates a dependency table based on the acquired host information, HBA information, switching information and storage information,
    the host information comprises a volume ID that denotes a logical volume managed by the host device, a mapping device ID that denotes a logical storage device mapped to the logical volume, and an HBA ID that denotes the HBA used when accessing the logical storage device,
    the HBA information comprises the HBA ID, an HBA port ID of the HBA, and an ID of a connection-destination storage port of the port, the connection-destination storage port is the storage port, which is the connection destination of the HBA port, and the storage port is a port of the storage device,
    the storage information comprises a storage device ID, a storage port ID, an ID of the logical storage device allocated to the storage port, and an ID of the host device that is allowed to access the logical storage device,
    the switching information comprises IDs of the respective ports of the switch, and IDs of the connection-destination ports of these ports,
    the monitoring target is the logical volume, the switching port, the storage port, and the logical storage device, and the dependency detector specifies the storage information that comprises the logical storage device ID, which matches the mapping device ID inside the host information, and which is associated with the host device ID, and detects a relationship between a system component or a monitoring target and the dependent target thereof based on the specified storage information, the HBA information comprising the HBA ID corresponding to the mapping device ID, host information comprising the mapping device ID, and the switching information.

3. The system monitoring apparatus according to claim 1, wherein, when an error state is detected subsequent to the start time of the preconfigured shutdown schedule period for a system component or a monitoring target corresponding to the preconfigured shutdown schedule period, the processor specifies the system component or monitoring target as the intentionally shutdown system component or the intentionally shutdown monitoring target.

4. The system monitoring apparatus according to claim 1, wherein the processor displays an error alert when an error state is detected for a monitoring target inside the intentionally shutdown system component or the intentionally shutdown monitoring target, after the normal state has been consecutively detected for a prescribed number of times within the preconfigured shutdown schedule period for the monitoring target inside the intentionally shutdown system component or the intentionally shutdown monitoring target.

5. The system monitoring apparatus according to claim 1, wherein the processor displays an error alert when an error state is detected for a monitoring target inside the intentionally shutdown system component or the intentionally shutdown monitoring target, subsequent to the end time of the preconfigured shutdown schedule period, in cases where the normal state has not been consecutively detected a prescribed number of times within the preconfigured shutdown schedule period for the monitoring target inside the intentionally shutdown system component or the intentionally shutdown monitoring target.

6. The system monitoring apparatus according to claim 1, wherein the processor does not display an error alert, but rather displays an information indicator pertaining to an affected monitoring target.

7. A method for monitoring a plurality of monitoring targets in a plurality of system components, which configure a computer system, the method comprising:
storing dependency information denoting a relationship between (1) a system component or a monitoring target inside the system component, and (2) a dependent target, which is a monitoring target inside another system component;
and effecting, via a processor, operations to:
(A) specify an intentionally shutdown system component or monitoring target as a specified system component or a specified monitoring target, respectively, based on a preconfigured shutdown schedule period;
(B) specify from the dependency information, a dependent target which is dependent on the intentionally shutdown system component or monitoring target, as a specified dependent target;
(C) monitor statuses of the respective monitoring targets;
(D) in case an error state of a given monitoring target is detected, display an error alert on a screen for the given monitoring target for which the error state is detected, while not displaying an error alert if the given monitoring target is the specified monitoring target, the specified dependent target or the monitoring target inside the specified system component;
(E) detect a normal state lasting for a predetermined period, of one or more of the intentionally shutdown system component or monitoring target within the preconfigured shutdown schedule period, as an indicator of an early end to the preconfigured shutdown schedule period.

8. The method according to claim 7,
wherein the plurality of system components are a host device, a Host Bus Adapter (HBA), a switching device and a storage device,
the method further comprises:
acquiring host information related to the host device, Host Bus Adapter (HBA) information related to the HBA of the host device, switching information related to the switching device, and storage information related to the storage device; and
creating a dependency table based on the acquired host information, HBA information, switching information and storage information,
the host information comprises a volume ID that denotes a logical volume managed by the host device, a mapping device ID that denotes a logical storage device mapped to the logical volume, and an HBA ID that denotes the HBA used when accessing the logical storage device,
the HBA information comprises the HBA ID, an HBA port ID of the HBA, and an ID of a connection-destination storage port of the port, the connection-destination storage port is the storage port, which is the connection destination of the HBA port, and the storage port is a port of the storage device,
the storage information comprises a storage device ID, a storage port ID, an ID of the logical storage device allocated to the storage port, and an ID of the host device that is allowed to access the logical storage device,
the switching information comprises IDs of the respective ports of the switch, and IDs of the connection-destination ports of these ports,
the monitoring target is the logical volume, the switching port, the storage port, and the logical storage device, and
the creating operation specifies the storage information that comprises the logical storage device ID, which matches the mapping device ID inside the host information, and which is associated with the host device ID, and detects a relationship between a system component or a monitoring target and the dependent target thereof based on the specified storage information, the HBA information comprising the HBA ID corresponding to the mapping device ID, host information comprising the mapping device ID, and the switching information.

9. The method according to claim 7, wherein, when an error state is detected subsequent to the start time of the preconfigured shutdown schedule period for a system component or a monitoring target corresponding to the preconfigured shutdown schedule period, the method specifies the system component or monitoring target as the intentionally shutdown system component or the intentionally shutdown monitoring target.

10. The method according to claim 7, wherein the method displays an error alert when an error state is detected for a monitoring target inside the intentionally shutdown system component or the intentionally shutdown monitoring target, after the normal state has been consecutively detected for a prescribed number of times within the preconfigured shutdown schedule period for the monitoring target inside the intentionally shutdown system component or the intentionally shutdown monitoring target.

11. The method according to claim 7, wherein the method displays an error alert when an error state is detected for a monitoring target inside the intentionally shutdown system component or the intentionally shutdown monitoring target, subsequent to the end time of the preconfigured shutdown schedule period, in cases where the normal state has not been consecutively detected a prescribed number of times within the preconfigured shutdown schedule period for the monitoring target inside the intentionally shutdown system component or the intentionally shutdown monitoring target.

12. The method according to claim 7, wherein the method does not display an error alert, but rather displays an information indicator pertaining to an affected monitoring target.

13. A non-transitory computer-readable medium embodying a computer program that is executed on a computer that monitors a plurality of monitoring targets in a plurality of system components, which configure a computer system, the computer program causing the computer to effect a method comprising:

storing dependency information denoting a relationship between (1) a system component or a monitoring target inside the system component, and (2) a dependent target, which is a monitoring target inside another system component;

and effecting, via a processor, operations to:

(A) specify an intentionally shutdown system component or monitoring target as a specified system component or a specified monitoring target, respectively, based on a preconfigured shutdown schedule period;

(B) specify from the dependency information, a dependent target which is dependent on the intentionally shutdown system component or monitoring target, as a specified dependent target;

(C) monitor statuses of the respective monitoring targets;

(D) in case an error state of a given monitoring target is detected, display an error alert on a screen for the given monitoring target for which the error state is detected, while not displaying an error alert if the given monitoring target is the specified monitoring target, the specified dependent target or the monitoring target inside the specified system component;

(E) detect a normal state lasting for a predetermined period, of one or more of the intentionally shutdown system component or monitoring target within the preconfigured shutdown schedule period, as an indicator of an early end to the preconfigured shutdown schedule period.

14. The medium according to claim 13, wherein the plurality of system components are a host device, a Host Bus Adapter (HBA), a switching device and a storage device, the method further comprises:

acquiring host information related to the host device, Host Bus Adapter (HBA) information related to the HBA of the host device, switching information related to the switching device, and storage information related to the storage device; and creating a dependency table based on the acquired host information, HBA information, switching information and storage information, the host information comprises a volume ID that denotes a logical volume managed by the host device, a mapping device ID that denotes a logical storage device mapped to the logical volume, and an HBA ID that denotes the HBA used when accessing the logical storage device, the HBA information comprises the HBA ID, an HBA port ID of the HBA, and an ID of a connection-destination storage port of the port, the connection-destination storage port is the storage port, which is the connection destination of the HBA port, and the storage port is a port of the storage device, the storage information comprises a storage device ID, a storage port ID, an ID of the logical storage device allocated to the storage port, and an ID of the host device that is allowed to access the logical storage device, the switching information comprises IDs of the respective ports of the switch, and IDs of the connection-destination ports of these ports, the monitoring target is the logical volume, the switching port, the storage port, and the logical storage device, and the creating operation specifies the storage information that comprises the logical storage device ID, which matches the mapping device ID inside the host information, and which is associated with the host device ID, and detects a relationship between a system component or a monitoring target and the dependent target thereof based on the specified storage information, the HBA information comprising the HBA ID corresponding to the mapping device ID, host information comprising the mapping device ID, and the switching information.

15. The medium according to claim 13, wherein, when an error state is detected subsequent to the start time of the preconfigured shutdown schedule period for a system component or a monitoring target corresponding to the preconfigured shutdown schedule period, the method specifies the system component or monitoring target as the intentionally shutdown system component or the intentionally shutdown monitoring target.

16. The medium according to claim 13, wherein the method displays an error alert when an error state is detected for a monitoring target inside the intentionally shutdown system component or the intentionally shutdown monitoring target, after the normal state has been consecutively detected for a prescribed number of times within the preconfigured shutdown schedule period for the monitoring target inside the intentionally shutdown system component or the intentionally shutdown monitoring target.

17. The medium according to claim 13, wherein the method displays an error alert when an error state is detected for a monitoring target inside the intentionally shutdown system component or the intentionally shutdown monitoring target, subsequent to the end time of the preconfigured shutdown schedule period, in cases where the normal state has not been consecutively detected a prescribed number of times within the preconfigured shutdown schedule period for the monitoring target inside the intentionally shutdown system component or the intentionally shutdown monitoring target.

18. The medium according to claim 13, wherein the method does not display an error alert, but rather displays an information indicator pertaining to an affected monitoring target.

* * * * *